Oct. 3, 1944.　　　　　S. ERIKSEN　　　　　2,359,550
FOWL VACCINATOR
Filed July 7, 1942
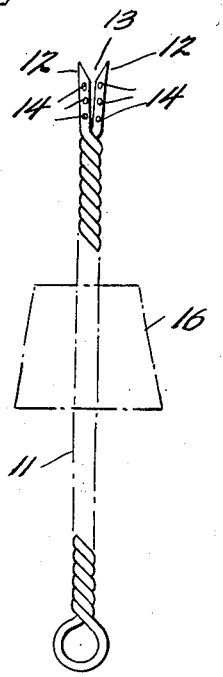
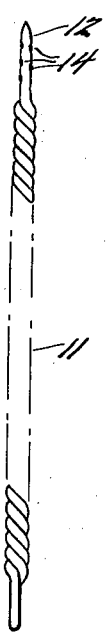
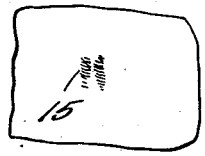
Inventor
Sivert Eriksen
By Emery, Holcombe & Miller
His Attorneys Patented Oct. 3, 1944

2,359,550

UNITED STATES PATENT OFFICE 2,359,550

FOWL VACCINATOR

Sivert Eriksen, Charles City, Iowa, assignor to Dr. Salsbury's Laboratories, a corporation of Iowa Application July 7, 1942, Serial No. 450,062

2 Claims. (Cl. 128—253)

This invention relates to implements for cutting and bruising or scarifying the skin of chickens and turkeys as required for introducing various vaccines including fowl pox vaccine and laryngotracheitis vaccine into the system in the vaccination of such creatures, and aims to improve such devices for general use in poultry raising communities.

In the vaccination of chickens and turkeys it has been customary to apply the vaccine with a brush onto the skin or dermis of the bird, but this procedure is objectionable because it is time consuming and the dosage cannot be measured or determined. As a result, some birds get too much vaccine and develop an "over take," while others get an insufficient amount and do not get takes. Ordinary needles, pen knives and other scratching devices have the same disadvantage although they are popular because of the speed obtained.

My improvement consists in providing the implement with two scarifying points having a space between them calculated to receive the proper dosage of vaccine and shaped to retain the vaccine by adhesion and surface tension until it is transferred to the wound. The invention further consists in shaping the scarifying points to aid in cutting and bruising the skin of the fowl to insure a proper "take" or penetration of the vaccine in quantity sufficient for producing the desired immunizing effect.

Other aims and advantages of the invention appear in connection with the following description of an illustrative embodiment shown in the accompanying drawing, wherein Fig. 1 is a side view of an implement suitable for vaccinating chickens for fowl pox, drawn to a scale about twice full size;

Fig. 2 is an edge view of the same; and

Fig. 3 is a plan view of the surface of a fowl's skin after vaccinating the bird with an implement such as illustrated in Figs. 1 and 2.

The implement shown in the drawing comprises a stem or handle portion 11 made of a doubled and twisted piece of wire of about twice the length of the complete device, the two ends of the wire being beveled and bent to diverge slightly to form points 12. The length of the points 12 and the width of the space 13 between the points are such as to hold the proper amount of vaccine for one inoculation, and in order to aid in roughening or scarifying the tissues, the sides of the wire adjacent to the points may be roughened, indented or serrated to form small patches 14, as shown in Fig. 1. In the preferred embodiment of this invention, the points should be about approximately ¼ inch long and separated at their extremities by approximately ⅛ inch.

The implement may be used in the ordinary manner for scratching or scarifying the skin and flesh of the bird under treatment, the result being to cut or bruise two spots 15 close together, as indicated in Fig. 3, each of which takes part of the vaccine and which coalesce to form a single scar of proper size if the vaccination is successful.

The implement is so small in diameter that it can be inserted in a vial or small prescription bottle deep enough to pick up the desired amount of vaccine by adhesion, the amount being gauged by the distance between and the length of the points.

If desired, the stem of the implement may be thrust through a cork 16, as shown in dotted lines in Fig. 1, for convenience in carrying it about in a small bottle or closed end tube, thus protecting it from contamination. Alcohol or other antiseptic liquid may be placed in the tube or bottle if desired, thereby enabling the implement to be kept ready for use at all times and providing convenient means for sterilizing it after use.

The implement is inexpensive and easily transported, cleaned and kept in condition for use and no special training is required to vaccinate chickens and turkeys with it, making it available to poultrymen and farm dwellers generally for treating their flocks and pet birds.

The invention is not restricted to the exact form and manner of construction illustrated.

What I claim is as follows:

1. A surgical instrument for vaccinating fowls having two sharp scarifying points slightly separated to provide a space between them for receiving a predetermined and proper amount of vaccine, the length and spacing of which points govern the amount of vaccine to be applied, the sides of said points being slightly roughened to better inoculate the fowl, and the said beveled points sloping away from each other toward their extremities.

2. An instrument as set forth in claim 1 made from a single piece of wire bent back and twisted upon itself to form a body portion of substantially uniform diameter which may be passed through a hole in a stopper for a bottle containing antiseptic or the like.

SIVERT ERIKSEN.